United States Patent
Son et al.

(10) Patent No.: US 11,254,576 B2
(45) Date of Patent: Feb. 22, 2022

(54) METHOD OF PREPARING GRAPHENE

(71) Applicant: LG Chem, Ltd., Seoul (KR)

(72) Inventors: Jin Young Son, Daejeon (KR); Cheol Woo Kim, Daejeon (KR); Byoung Hoon Ahn, Daejeon (KR); Hyun Sik Chae, Daejeon (KR); Sang Hoon Choy, Daejeon (KR)

(73) Assignee: LG Energy Solution, Ltd. (KR)

( * ) Notice: Subject to any disclaimer, the term of this patent is extended or adjusted under 35 U.S.C. 154(b) by 37 days.

(21) Appl. No.: 16/606,962

(22) PCT Filed: Apr. 10, 2018

(86) PCT No.: PCT/KR2018/004213
§ 371 (c)(1),
(2) Date: Oct. 21, 2019

(87) PCT Pub. No.: WO2018/199512
PCT Pub. Date: Nov. 1, 2018

(65) Prior Publication Data
US 2020/0331759 A1 Oct. 22, 2020

(30) Foreign Application Priority Data

Apr. 28, 2017 (KR) .................. 10-2017-0055639

(51) Int. Cl.
*C01B 32/19* (2017.01)
(52) U.S. Cl.
CPC .................. *C01B 32/19* (2017.08)
(58) Field of Classification Search
CPC ..... C01B 32/19; C01B 32/182; C01B 32/198; C01B 2204/00; C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23

See application file for complete search history.

(56) References Cited

U.S. PATENT DOCUMENTS

2013/0102084 A1 4/2013 Loh et al.
2013/0134157 A1 5/2013 Knox et al.
(Continued)

FOREIGN PATENT DOCUMENTS

CA 2795965 A1 5/2014
CN 106587036 A 4/2017
(Continued)

OTHER PUBLICATIONS

Shen, et al., Preparation of high quality graphene using high gravity technology, Chemical Engineering and Processing 2016; 106: 59-66 (Year: 2016).*

(Continued)

*Primary Examiner* — Anthony J Zimmer
(74) *Attorney, Agent, or Firm* — Lerner, David, Littenberg, Krumholz & Mentlik, LLP

(57) ABSTRACT

A method of preparing graphene, including preparing graphite; and putting the graphite in the inside of a vessel and applying vibration at a frequency of 55 Hz to 65 Hz to the vessel.

20 Claims, 4 Drawing Sheets

(56) References Cited

U.S. PATENT DOCUMENTS

| | | | |
|---|---|---|---|
| 2016/0101980 | A1 | 4/2016 | Hasegawa et al. |
| 2016/0280551 | A1 | 9/2016 | Hasegawa et al. |
| 2017/0158513 | A1* | 6/2017 | Zhamu .................. C01B 32/194 |
| 2017/0166449 | A1 | 6/2017 | Yoo et al. |
| 2017/0240427 | A1 | 8/2017 | Knox et al. |

FOREIGN PATENT DOCUMENTS

| | | |
|---|---|---|
| JP | H04045535 U | 4/1992 |
| JP | 2013536141 A | 9/2013 |
| JP | 5725635 B1 | 5/2015 |
| JP | 6044934 B2 | 12/2016 |
| KR | 20140117373 A | 10/2014 |
| KR | 20160048378 A | 5/2016 |
| KR | 101682007 B1 | 12/2016 |
| WO | 2014122465 A1 | 8/2014 |
| WO | 2015092871 A1 | 6/2015 |
| WO | 2016002254 A1 | 1/2016 |

OTHER PUBLICATIONS

Difference between g and G in tabular form, accessed online at: https://physicsabout.com/difference-between-g-and-g/ on Feb. 13, 2021 (Year: 2021).*

Centrifugal Force Calculator, accessed online at: https://www.omnicalculator.com/physics/centrifugal-force#centrifugal-force-equation on Apr. 23, 2021 (Year: 2021).*

G Force Calculator, accessed online at: https://www.sigmaaldrich.com/technical-documents/articles/biology/g-force-calculator.html on Apr. 23, 2021 (Year: 2021).*

Rozploch, et al., Graphenes Bonding Forces in Graphite, Acta Physica Polonica A 2007; 112(3): 557-562 (Year: 2007).*

Fitzer, et al., Recommended Terminology for the Description of Carbon as a Solid, Pure & Appl. Chem. 1995; 67(3): 473-506 (Year: 1995).*

Extended European Search report for EP20180791494 dated Nov. 26, 2019, 8 pages.

Min Yi et al.:, "A review on mechanical exfoliation for the scalable production of graphene", Journal of Materials Chemistry A,, vol. 3, No. 22, Jan. 1, 2015, p. 11700-11715, XP055323483.

Zianglu Yin et al: "Preparation of Two-Dimensional Molybdenum Disulfide Nanosheets by High-Gravity Technology", Industrial & Engineering Chemistry Research, vol. 56, No. 16, Apr. 5, 2017, p. 4736-4742, XP055638678.

International Search Report for Application No. PCT/KR2018/004213, dated Jul. 19, 2018, pp. 1-2.

Shen et al., Preparation of High Quality Graphene Using High Gravity Technology, Chemical Engineering and Processing: Process Intensification, pp. 59-66, available online May 2016, vol. 106.

Dr. Václav Stengl, "Preparation of Graphene by Using an Intense Cavitation Field in a Pressurized Ultrasonic Reactor", Chemistry: A European Journal, vol. 18, Issue 44, Oct. 29, 2012, pp. 14047-14054, First published: Sep. 27, 2012.

* cited by examiner

METHOD OF PREPARING GRAPHENE

CROSS-REFERENCE TO RELATED APPLICATIONS

This application is a national phase entry under 35 U.S.C. § 371 of International Application No. PCT/KR2018/004213, filed Apr. 10, 2018, which claims priority to Korean Patent Application No. 10-2017-0055639, filed Apr. 28, 2017, the disclosures of which are incorporated herein by reference.

TECHNICAL FIELD

The present invention relates to a method of preparing graphene, wherein the method of preparing graphene may specifically include preparing graphite; and putting the graphite in the inside of a vessel and applying vibration at a frequency of 55 Hz to 65 Hz to the vessel.

BACKGROUND ART

In general, graphene is a semi-metallic material having a thickness corresponding to a carbon atom layer in which carbon atoms are two-dimensionally arranged in a hexagonal shape and connected by sp2 bonds. The graphene not only has excellent electrical conductivity, but also has structural and chemical stabilities and excellent thermal conductivity. Also, since the graphene is composed of only carbon, a relatively light element, a one-dimensional or two-dimensional nanopattern is easily processed. Above all, the graphene sheet is an inexpensive material, wherein it has excellent price competitiveness in comparison to conventional nanomaterials.

Due to these electrical, structural, chemical, and economic characteristics, it is predicted that graphene may replace silicon-based semiconductor technology and transparent electrodes in the future, and, particularly, it is expected that graphene may be applied to a flexible electronic device field due to excellent mechanical properties.

Due to the excellent properties of graphene, various methods capable of more effectively mass-producing graphene from a carbon-based material, such as graphite, have been proposed or studied.

Among them, a method of preparing graphene by grinding graphite together with a dispersant is used (Korean Patent No. 10-1682007). However, when the above method is used, since the graphene formed during a preparation process is excessively ground due to the dispersant, it is difficult to obtain graphene with desired size and shape, and thus, there is a limitation in that process yield is low and manufacturing cost is high. Also, since type and ratio of the dispersant may be optimally adjusted according to a raw material such as graphite, flexibility of the process may be reduced.

Therefore, there is a need for a new method of preparing graphene in which a dispersant is not used.

PRIOR ART DOCUMENT

Patent Document (Patent Document 1) Korean Patent No. 10-1682007

DISCLOSURE OF THE INVENTION

Technical Problem

An aspect of the present invention provides a method of preparing graphene in which a dispersant is not used and a process is simplified.

Technical Solution

According to an aspect of the present invention, there is provided a method of preparing graphene which includes: preparing graphite; and putting the graphite in inside of a vessel and applying vibration at a frequency of 55 Hz to 65 Hz to the vessel.

Advantageous Effects

According to a method of preparing graphene according to an embodiment of the present invention, since the method does not use a dispersant, a grinding phenomenon of graphene may be prevented, and thus, process yield may be improved and a preparation process may be simplified. Therefore, manufacturing costs may be reduced.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
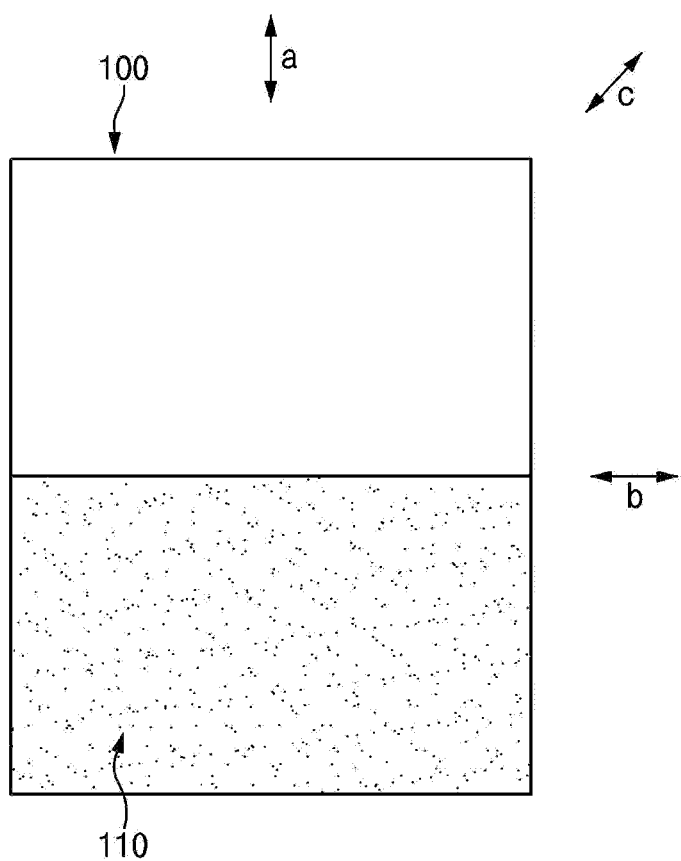
FIG. 1 is a schematic view of a vessel used in a method of preparing graphene of the present invention.

Hereinafter, the present invention will be described in more detail to allow for a clearer understanding of the present invention.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular example embodiments only and is not intended to be limiting of the present invention. In the specification, the terms of a singular form may comprise plural forms unless referred to the contrary.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

A method of preparing graphene according to an embodiment of the present invention may include preparing graphite; and putting the graphite in inside of a vessel and applying vibration at a frequency of 55 Hz to 65 Hz to the vessel.

Since the graphite has a three-dimensional structure in which carbon atom layers are stacked, the graphite may be an arbitrary carbon-based material which may be prepared as graphene having one or more carbon atom layers through exfoliation by an arbitrary physical force such as high speed, high pressure, ultrasonic irradiation, or a shear force.

In the preparing of the graphene, the graphite may include at least one selected from natural graphite and artificial graphite.

A shape of the graphite may be any one of an irregular shape, a plate shape, and an expanded shape. Specifically, the shape of the graphite may be a plate shape. In a case in which the shape of the graphite is the plate shape, since the exfoliation of the graphite may be effectively performed by vibration, graphene may be smoothly formed. Thus, graphene having smaller thickness and wider area may be prepared, and, accordingly, graphene with better characteristics and minimized occurrence of defects may be well prepared.

The graphite may have an average particle diameter ($D_{50}$) of 5 μm to 30 μm, for example, 5 μm to 20 μm. When the average particle diameter satisfies the above range, a conductive path may be sufficiently secured if the prepared graphene is used in an electrode.

In the putting of the graphite in the inside of the vessel, the graphite may be added to the inside of the vessel in an amount of 10 vol % to 90 vol %, for example, 50 vol % to 80 vol % based on a total internal volume of the vessel. In a case in which the amount of the graphite added satisfies the above range, the preparation of graphene by collision of graphites may be effectively performed.

The inside of the vessel may be cylindrical, and, in this case, since a space (dead space), which does not affect the grinding of the graphite, is minimized, process efficiency may be improved.

The vessel may be a sealed vessel.

An internal pressure of the vessel to which the graphite is added may be atmospheric pressure. Alternatively, the internal pressure may be $10^{-2}$ Hg or less, and may specifically be vacuum. In a case in which the internal pressure of the vessel is $10^{-2}$ Hg or less, since collision interference by internal air is somewhat removed, the preparation of the graphene may proceed more smoothly.

A frequency of the vibration applied to the vessel to which the graphite is added may be in a range of 55 Hz to 65 Hz, for example, 58 Hz to 62 Hz. The graphite is in the form in which a plurality of carbon atom layers are stacked. In the graphite, carbon atoms arranged in the same carbon atom layer are bonded to each other by a double bond, and carbon atoms disposed in different carbon atom layers are bonded to each other by van der Waals bonds that are weaker than the above double bond. Also, the frequency range of 55 Hz to 65 Hz corresponds to a resonance frequency range in which the van der Waals bonds may be broken. Thus, when the vibration within the above frequency range is applied to the graphite, the double bond may be maintained, but the van der Waals bonds may be broken, and thus, graphene may be formed.

Alternatively, in a case in which vibration outside the above frequency range is applied to the vessel, since the van der Waals bonds are not easily broken, the yield of graphene is decreased.

A dispersant may not be included in the vessel to which the vibration is applied. Specifically, the graphite may be the only material included in the vessel to which the vibration is applied. During the preparation of the graphene, since a separate dispersant is not added with the graphite, a process may be simplified. Since it is not necessary to adjust the type and ratio of the dispersant in consideration of raw materials, such as graphite, used in the preparation of the graphene, the process may be flexibly used depending on the purpose of the graphene. Also, since the problem that the prepared graphene is ground by the dispersant may not occur, graphene with the desired size and shape may be obtained smoothly.

FIG. 1 is a schematic view of the vessel used in the method of preparing graphene of the present invention. Referring to FIG. 1, the vibration may be applied in at least one direction of a vertical direction (a), a horizontal direction (b), and a diagonal direction (c) of a vessel 100 in which graphite 110 is contained. For example, the vibration may be applied only in the vertical direction (a), or may be applied in the horizontal direction (b) or the diagonal direction (c) following the vertical direction (a), and such a pattern may be repeated.

The vibration may be applied to the vessel for 10 minutes to 60 minutes, for example, 30 minutes to 50 minutes. When the above range is satisfied, graphene may be effectively prepared.

An acceleration of the vibration may be in a range of 50 g to 100 g, for example, 70 g to 80 g. When the above range is satisfied, since the damage to graphite is less, excellent graphene may be prepared.

Hereinafter, preferred examples will be provided for better understanding of the present invention. It will be apparent to those skilled in the art that these examples are only provided to illustrate the present invention and various modifications and alterations are possible within the scope and technical spirit of the present invention. Such modifications and alterations fall within the scope of claims included herein.

EXAMPLES AND COMPARATIVE EXAMPLES

Example 1: Preparation of Graphene

Figure 2:
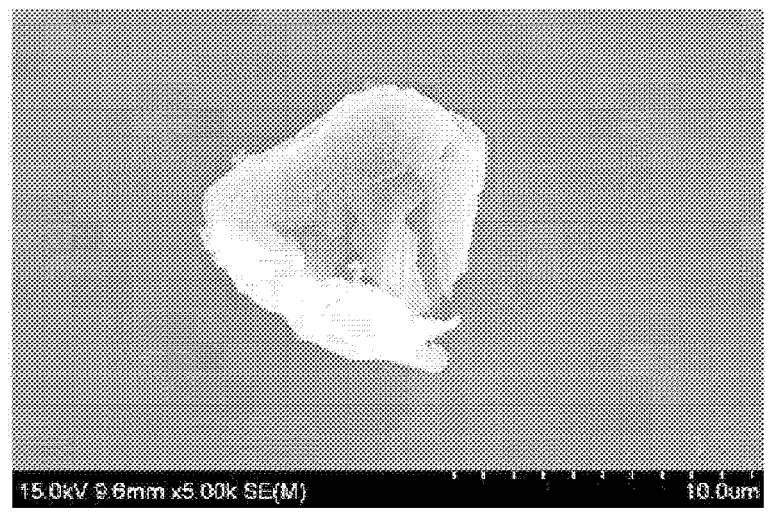
FIG. 2 is an image of graphite used in an embodiment of the present invention.

Plate-shaped artificial graphite (see FIG. 2) having an average particle diameter (D50) of 10 μm was added to a polycarbonate (PC) vessel having a volume of an internal space of 200 ml, but, in this case, the artificial graphite was added such that an amount of the artificial graphite added was 50 vol % based on a total internal volume of the vessel. Thereafter, the vessel was sealed. Vibration (acceleration: 80 g) at a frequency of 60 Hz was applied to the vessel containing the artificial graphite in a vertical direction for 40 minutes to prepare graphene, and an image of the prepared graphene was taken with a scanning electron microscope (SEM) and presented in FIG. 3.

Example 2: Preparation of Graphene

Figure 4:
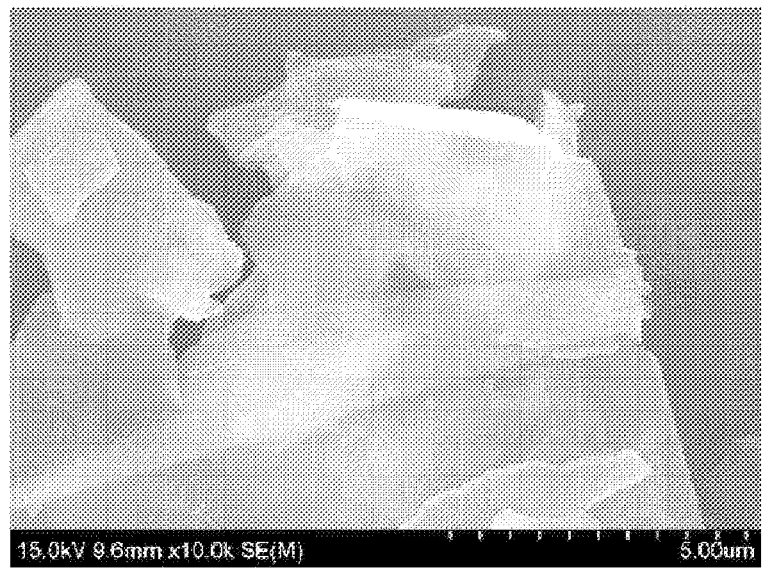
FIG. 4 is an image of graphene which is prepared by a method of preparing graphene according to an example of the present invention.

Graphene was prepared in the same manner as in Example 1 except that the vibration was applied to the vessel for 60 minutes, and an image of the graphene is presented in FIG. 4.

Example 3: Preparation of Graphene

Figure 5:
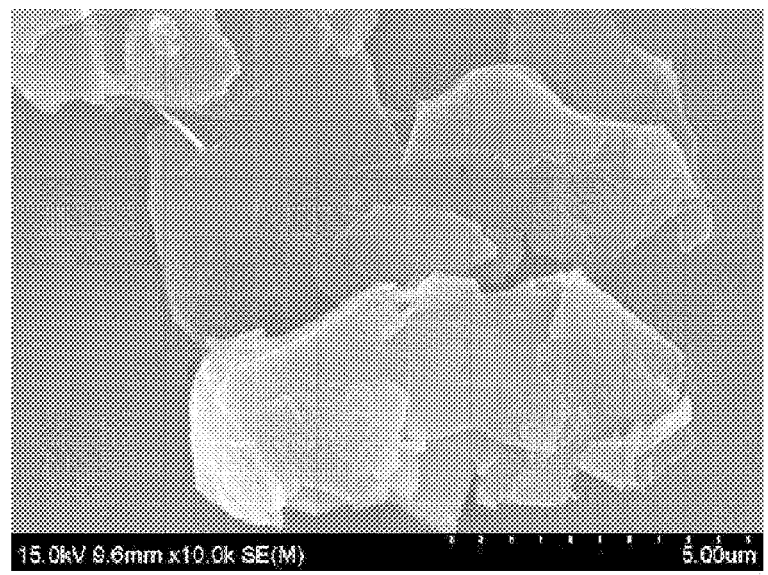
FIG. 5 is an image of graphene which is prepared by a method of preparing graphene according to an example of the present invention.

Graphene was prepared in the same manner as in Example 1 except that the vibration was applied to the vessel for 10 minutes, and an image of the graphene is presented in FIG. 5.

Comparative Example 1: Preparation of Graphene

Figure 6:
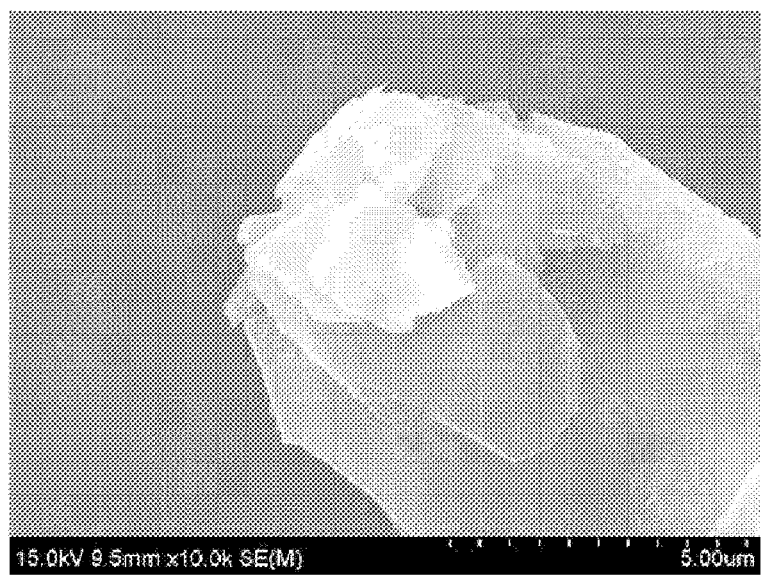
FIG. 6 is an image of graphene which is prepared by a method of preparing graphene according to a comparative example of the present invention.

Graphene was prepared in the same manner as in Example 1 except that the frequency of the vibration applied to the vessel was 50 Hz, and an image of the graphene is presented in FIG. 6.

Comparative Example 2: Preparation of Graphene

Figure 7:
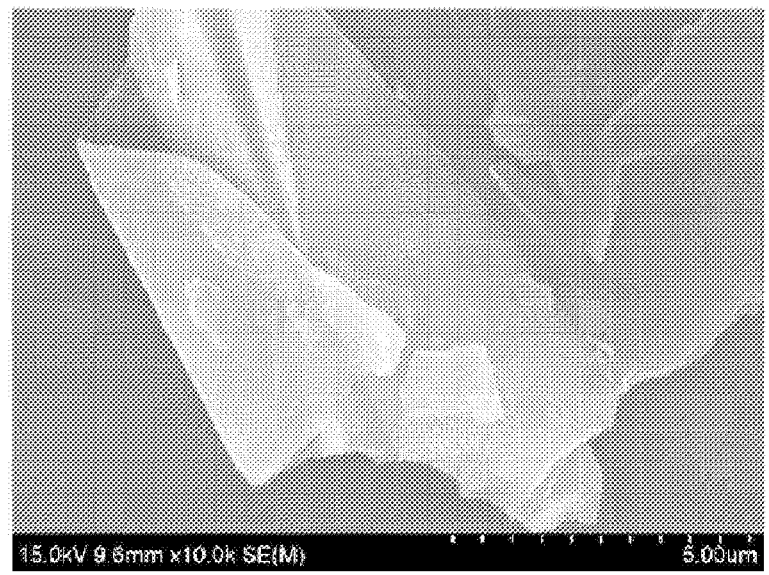
FIG. 7 is an image of graphene which is prepared by a method of preparing graphene according to a comparative example of the present invention.

Graphene was prepared in the same manner as in Example 1 except that the frequency of the vibration applied to the vessel was 70 Hz, and an image of the graphene is presented in FIG. 7.

Referring to FIGS. 3 to 7, it may be confirmed that the graphenes prepared by the preparation methods of Examples 1 to 3 had a better thin-film shape than the graphenes prepared by the preparation methods of Comparative Examples 1 and 2. Thus, it may be confirmed that the application of the vibration at a frequency of 55 Hz to 65 Hz is an important factor for preparing high-quality graphene.

Figure 3:
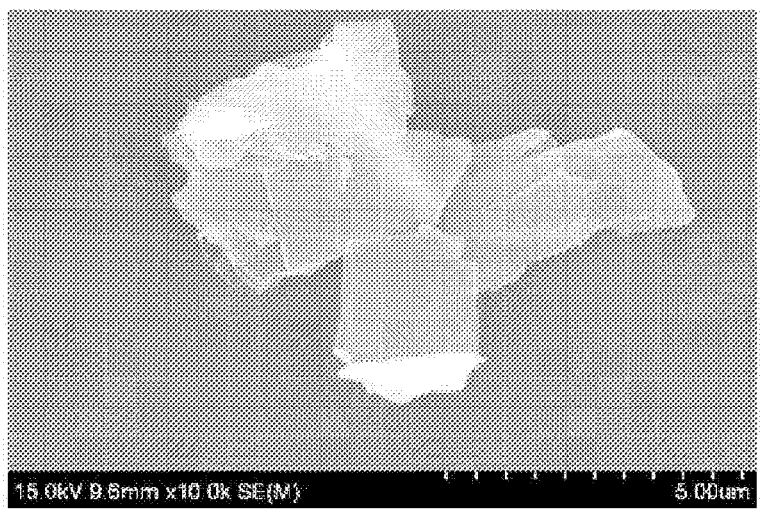
FIG. 3 is an image of graphene which is prepared by a method of preparing graphene according to an example of the present invention.

When FIG. 3 and FIG. 5 are compared, it may be understood that the graphene of Example 1 had a more elaborate thin-film shape than the graphene of Example 3. Thus, it may be confirmed that higher-quality graphene may be formed when the time for applying the vibration as well as the frequency was adjusted to an appropriate level.

The invention claimed is:

1. A method of preparing graphene comprising:
preparing graphite; and
putting the graphite in inside of a vessel and applying vibration at a frequency of 55 Hz to 65 Hz to the vessel with the graphite inside to prepare the graphene.

2. The method of claim 1, wherein the graphite has an average particle diameter ($D_{50}$) of 5 μm to 30 μm.

3. The method of claim 1, wherein the graphite comprises at least one of natural graphite or artificial graphite.

4. The method of claim 1, wherein a shape of the graphite is any one of an irregular shape, a plate shape, or an expanded shape.

5. The method of claim 1, wherein the putting the graphite in the inside of the vessel comprises:
adding the graphite to the inside of the vessel in an amount of 10 vol % to 90 vol % based on a total internal volume of the vessel.

6. The method of claim 1, wherein the graphite is only material included in the vessel to which the vibration is applied.

7. The method of claim 1, wherein an acceleration of the vibration is in a range of 50 g to 100 g.

8. The method of claim 1, wherein the vibration is applied in at least one direction of a vertical direction, a horizontal direction, or a diagonal direction of the vessel.

9. The method of claim 1, wherein the vibration is applied for 10 minutes to 60 minutes.

10. The method of claim 1, wherein the inside of the vessel is cylindrical.

11. The method of claim 1, wherein the method does not include adding a dispersant.

12. A method of preparing graphene comprising:
putting graphite in inside of a vessel, and
applying vibration to the vessel with the graphite inside at a frequency of 55 Hz to 65 Hz to prepare the graphene.

13. The method of claim 12, wherein the graphite has an average particle diameter ($D_{50}$) of 5 μm to 30 μm.

14. The method of claim 12, wherein the graphite comprises at least one of natural graphite or artificial graphite.

15. The method of claim 12, wherein a shape of the graphite is any one of an irregular shape, a plate shape, or an expanded shape.

16. The method of claim 12, wherein the putting the graphite in the inside of the vessel comprises:
adding the graphite to the inside of the vessel in an amount of 10 vol % to 90 vol % based on a total internal volume of the vessel.

17. The method of claim 12, wherein the graphite is only material included in the vessel to which the vibration is applied.

18. The method of claim 12, wherein an acceleration of the vibration is in a range of 50 g to 100 g.

19. The method of claim 12, wherein the vibration is applied in at least one direction of a vertical direction, a horizontal direction, or a diagonal direction of the vessel.

20. The method of claim 12, wherein the vibration is applied for 10 minutes to 60 minutes.

* * * * *